United States Patent [19]
Terry, deceased et al.

[11] 3,899,652
[45] Aug. 12, 1975

[54] EXTENDED RANGE INDUCTOR ALTERNATOR ARC WELDER

[75] Inventors: Stanley M. Terry, deceased, late of Dayton, Maine, by the Third National Bank of Hampden County, executor, Springfield, Mass.

[73] Assignee: Maremont Corporation, Saco, Maine

[22] Filed: Dec. 26, 1973

[21] Appl. No.: 427,818

[52] U.S. Cl. .................................. 219/133; 322/25
[51] Int. Cl. ............................................ H02k 17/42
[58] Field of Search ........... 219/131, 133, 134, 135; 322/25, 27, 63, 47

[56] References Cited
UNITED STATES PATENTS

| | | | |
|---|---|---|---|
| 2,555,539 | 6/1951 | Graybrook | 322/27 |
| 3,204,173 | 8/1965 | Jackson | 322/47 |
| 3,328,671 | 6/1967 | Pflasterer | 219/135 |
| 3,649,903 | 3/1972 | Fiedler | 322/27 |

FOREIGN PATENTS OR APPLICATIONS

| | | | |
|---|---|---|---|
| 218,357 | 6/1964 | U.S.S.R. | 219/135 |

Primary Examiner—J. V. Truhe
Assistant Examiner—Clifford C. Shaw

[57] ABSTRACT

An arc welder comprises an inductor alternator having two field windings, a rectifier for rectifying the alternator output, and an internal combustion engine, electric motor or other prime mover for driving the alternator. A variable electrical supply is provided for energizing one field winding of the alternator. By varying the excitation voltage of such one field winding, varying output currents for welding are produced, and over a given range of excitation voltages, the corresponding open circuit voltages will fall within a relatively narrow range of voltages considered ideal or most favorable for welding purposes. A switch means is provided for connecting the second field winding of the alternator in series with the welder output circuit in either a compound differential or aiding mode. This alters the output characteristics of the welder resulting in a lower or higher range of welding currents being produced for the same range of open circuit voltages, thereby extending the usefulness of the welder.

5 Claims, 4 Drawing Figures

PATENTED AUG 1 2 1975   3,899,652
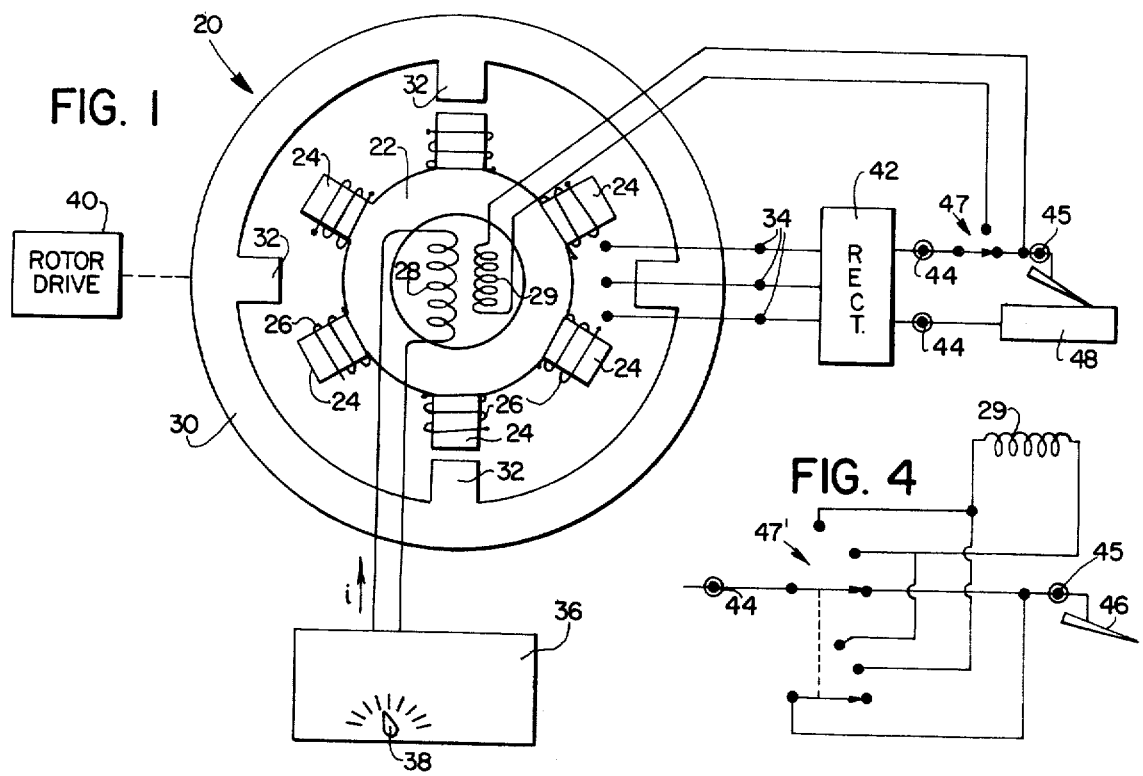
FIG. 1
FIG. 4
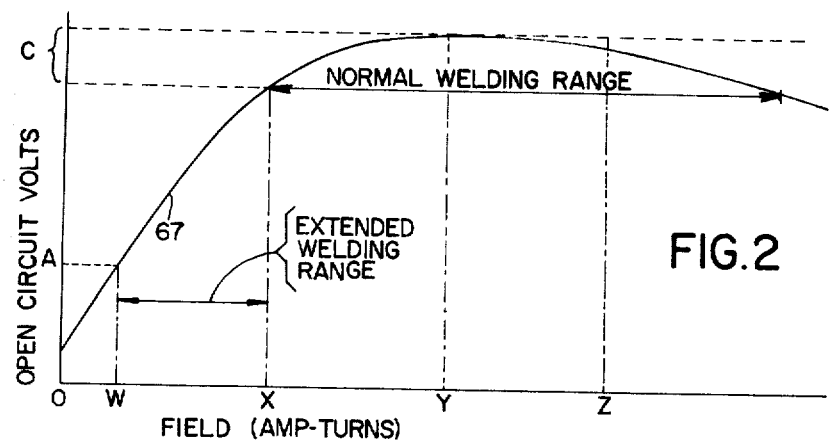
FIG. 2
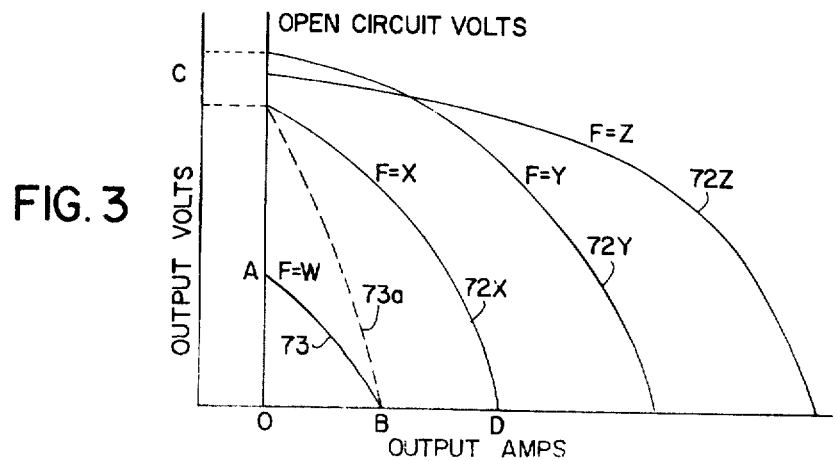
FIG. 3

3,899,652

EXTENDED RANGE INDUCTOR ALTERNATOR ARC WELDER

BACKGROUND OF THE INVENTION

This invention relates to the art of arc welding and deals more particularly with arc welders which utilize an inductor alternator as the source of welding current. The welder is broadly of the type consisting of a generator for producing the welding current and a drive, such as an electric motor or gasoline engine, for driving the generator together with a rectifier for rectifying the output of the generator. In the past, welders of this general type have been subject to a number of problems, among which is the difficulty of designing and properly controlling the generator to cause it to produce output characteristics desirable for arc welding. To achieve generally desirable output characteristics and to allow for adjustment of the welding current, known arc welders of the type in question customarily employ some form of regulating circuit for regulating the voltage and/or current appearing at the output terminals or at some other point in the welder, and often employ series reactors, load control resistors, or other devices to provide for rapid voltage recovery, to aid in striking and maintaining the arc when going from a short circuit condition to a normal welding spacing between the electrode and workpiece. These regulators, reactors and the like all add to the complexity and cost of the welder and decrease the overall efficiency.

A recent invention as described in co-pending U.S. patent application Ser. No. 327,207, filed Jan. 26, 1973 and entitled ARC WELDER AND COMBINED AUXILIARY POWER UNIT AND METHOD OF ARC WELDING, now U.S. Pat. No. 3,829,652 involves the use of a particular type of alternator in an arc welder of this general type to eliminate the need for regulators, reactors and other similar devices for controlling or modifying the welder output. That is, the alternator is an inductor alternator of such design that when properly excited, an output characteristic is produced which is highly suited to arc welding and wherein, by merely changing the field excitation, the welding current may be varied without substantially changing the open circuit voltage, to suit the particular welding job at hand as determined by the workpiece material and size, type of welding rod, and other factors. There is low-end critical excitation current, however, below which the open circuit output voltage drops fairly rapidly and below which the open circuit output voltage is less than desired for good striking of an arc. It is desirable to maintain a minimum open circuit voltage of, for example, 60 volts for good striking of an arc, and a problem, therefore, arises when a low value of output current is called for which requires a low field excitation having an associated open circuit voltage of less than the desired minimum of, for example, 60 volts. Likewise, the output characteristic of the alternator of the aforesaid patent application has a high-end critical excitation current. As the field excitation is increased above this high-end critical value, the output welding current continues to increase, but the associated open circuit output voltage is less than the desired minimum voltage. Another problem, therefore, arises when a high value of output current is called for which requires a high field excitation having an associated open circuit voltage of less than the desired minimum value thereof.

The present invention particularly relates to the type of welder disclosed in the aforementioned co-pending patent application and extends either the useful low current welding range, the useful high current welding range, or both such ranges, of such arc welder by allowing lower or higher welding output currents to be produced than would otherwise be achievable for corresponding values of open circuit output voltage safe and suitable for arc striking, without the use of external current regulators or load control resistors.

SUMMARY OF THE INVENTION

This invention resides in an arc welder wherein a welding current is produced by an inductor alternator. The alternator includes two field windings; a main or excitation field winding which is excited by an external variable DC source and a series field winding which is selectively connected in or disconnected from series relationship with the output circuit of the welder. The series field winding is wound and connected in either a compound differential or aiding manner with respect to the main winding so that when the series field winding is brought into play and when output current is flowing, a field is set up in the series field winding which either opposes or aids the field produced in the main field winding, thereby either reducing or increasing the overall field strength. When the output circuit is open, the compound field has an overall field strength equal to that produced by the main field winding itself, but when the output circuit is closed, the strength of the compound field is either weaker or stronger than that produced by the main field winding itself. Accordingly, when the series field winding is connected in series with the output circuit, the open circuit voltage is still determined solely by the excitation of the main field, but the closed circuit output current is dependent on both the main field and the series field and is either smaller or larger than it would be if determined by the main field alone. Thus, for corresponding values of open circuit output voltage, use of this invention enables the production of lower or higher welding currents than would be possible using only a single field winding and without resort to current regulators, load control resistors, and the like.

BRIEF DESCRIPTION OF THE DRAWINGS

FIG. 1 is a schematic illustration of an arc welder embodying this invention.

FIGS. 2 and 3 are diagrams showing the electrical output characteristics of the welder of FIG. 1.

FIG. 4 is a schematic diagram of a switch which may be substituted for the one shown in FIG. 1 to provide a different embodiment of the invention.

DESCRIPTION OF THE PREFERRED EMBODIMENTS

FIG. 1 Welder

Turning to the drawings, FIG. 1 shows in schematic form an arc welder embodying this invention and which, except for an additional field winding series connectable in the output circuit, is or may be substantially similar to the arc welder shown and described in U.S. Pat. No. 3,829,652. Reference may be had to said patent for a more complete understanding of the illustrated system. However, for present purposes, it may be noted that the system comprises an inductor alternator 20, drive means 40 drivingly connected to the rotor 30 of said alternator, a rectifier 42 for converting the AC output of the alternator at terminals 34, 34 to a DC output at terminals 44, 44, and a variable DC voltage source 36 connected to a main alternator field winding 28, said voltage source 36 including a movable member 38 by which the voltage supplied to said main field winding 28 may be varied.

Within the broader aspects of the invention, the inductor alternator of the arc welder may be of various different designs and may be either a single or multi-phased device. The presently preferred form of inductor alternator, as exemplified by the alternator 20 of FIG. 1, is comprised of, in addition to the main field winding 28 and rotor 30 above mentioned, a stationary stator core 22 of magnetic material having a plurality of stator poles 24, 24 on each of which is received a respective one of a plurality of generating windings 26, 26. Fixed relative to the stator core 22 is the main field winding 28 and an additional field winding 29. In the aforesaid co-pending patent application, the main field winding is a single annular winding concentric with the axis of rotor rotation and in such a case, the additional field winding may be a number of annular turns of heavier wire, sufficient to carry the output welding current, also concentric with the axis of rotor rotation and located directly adjacent the main welding. That is, the additional field winding may be, for example, located radially outside of, radially inside of, or axially to one side of the main winding. Cooperating with the stator core is the rotor 30 having a plurality of rotor teeth 32, 32. For purposes of clarity, in the inductor alternator 20 of FIG. 1, only a relatively small number of stator poles and rotor teeth have been shown, and it will be understood that in an actual inductor alternator, a larger number of stator poles and rotor teeth will usually be employed. However, in FIG. 1, the stator poles and rotor teeth have been shown to be arranged in such a manner and to be so related in number as to produce a three-phase output. Also, the connections between the windings 26, 26 and the terminals 34, 34 have been omitted for clarity, but it will be understood that within each phase group, the individual windings of the group are connected to one another in either series or parallel relationship, and the three-phase groups are connected to one another and to the output terminals 34, 34 in either a delta or a wye configuration to produce a three-phase alternating output voltage at the output terminals 34, 34.

In the device of the aforesaid co-pending application, connection is made directly between the rectifier output terminals 44, 44 and, respectively, the workpiece 48 and the welding electrode 46. In the present invention, however, a switch 47 is connected between one rectifier terminal 44 and an associated terminal 45 which latter terminal is, in turn, connected to the welding electrode. The switch 47 is a single pole, double throw switch which, it will be understood from FIG. 1, in one position connects the associated output terminal 44 of the rectifier directly to the terminal 45 and in its other position, connects the additional field winding in series circuit between said terminal 44 and the terminal 45. The connections for the winding 29 and its direction of winding is further such that when the switch 47 is set to bring the winding 29 into play, the current flowing through it will produce a field flux opposing the field flux of the main field winding 28.

Operation of FIG. 1 Welder

Series Winding Out of Play

It is evident that when the switch 47 is in the position illustrated in FIG. 1, the additional field winding 29 is removed from operation and, therefore, the field excitation and output characteristics of the welder of FIG. 1 will be basically equivalent to the welder disclosed in the aforesaid co-pending application. FIG. 2, by the solid line 67 thereof, shows the general nature of the open circuit output voltage versus field strength characteristic of the arc welder of this invention. It will be seen that as the field strength is increased from zero, the open circuit output voltage increases to a maximum or peak value and then decreases. Furthermore, the top of the characteristic curve 67 is relatively flat so that over a relatively wide range of field excitation values the open circuit output voltage remains substantially constant and close to the peak value. The field excitation is usually varied within a range, indicated in FIG. 2 as the normal welding range, within which the open circuit output voltage remains relatively constant and close to the maximum or peak value of the open circuit output voltage obtainable. That is, the output of the alternator within the welding range of field excitation values is such that the corresponding open circuit output voltage remains within a relatively narrow and ideal welding range of open circuit voltages, for example, between 60 volts and 80 volts, as indicated at C.

The family of curves represented by the solid lines in FIG. 3 show the output current versus output voltage characteristic of the welder of this invention, with the switch 47 in the FIG. 1 position, for various values of field excitations. These characteristic curves are indicated at $72x$, $72y$, $72z$ and 73. The curves $72x$, $72y$ and $72z$ are curves for values of field excitation within the normal welding range of field excitation indicated in FIG. 2, and the curve 72 is a curve for a value of field excitation below the normal welding range. The curve $72x$ is that produced at the lowest level of field excitation, indicated at X in FIG. 2, within the normal welding range and the curves $72y$ and $72z$ are those produced at successively greater values of field excitations, indicated at Y and Z respectively in FIG. 2. The curve 73 is that produced by a level of field excitation, indicated at W, below the normal welding range of FIG. 2. From FIG. 3 it will be noted that the output current is dependent on the field excitation. Therefore, the output current may be varied as desired to suit the particular welding job at hand by merely varying the field excitation.

Still referring to FIG. 3, it will be further noted, as also evident from FIG. 2, that when the output current is zero, indicating an open circuit or no load condition, the output voltage remains within the desired range C despite changes in the field excitation provided the field excitation remains within the normal welding range of field excitations, as it does for the illustrated curves $72x$, $72y$ and $72z$. The alternator may be so designed for example, that the maximum open circuit voltage obtainable is approximately 80 volts. The fact that the open circuit voltage does not increase beyond this value as the field excitation is varied is desirable for safety reasons, and the fact that it does not decrease substantially below the value as the field excitation is varied over a relatively wide range of excitation values is desirable as an open circuit output voltage of about 60 volts or more is usually considered necessary for satisfactory establishment of an arc.

If an output welding current lower than that designated by D in FIG. 3 is desired, the field excitation must be set at a value below the normal welding range of excitation. This is the case, for example with the characteristic curve 73 of FIG. 3, the corresponding field excitation of which is indicated at W in FIG. 2. Unfortunately, at this field excitation, the resulting open circuit output voltage, indicated at A, is far below the bottom of the desirable or ideal range of open circuit output voltages, indicated at C in FIGS. 2 and 3.

Series Winding in Play

It is possible to alter the output characteristics of the welder of FIG. 1 by shifting the switch 47 from its illustrated position to its alternate position at which the winding 29 is connected in series with the output current. As mentioned, the direction of winding and connection of the two field windings is such that when the winding 29 is so brought into play, the field of the winding 29 opposes that of the main field 28. This is referred to as series differential compounding and the resulting total field will be smaller than the field provided by the main winding 28 itself by an amount generally proportional to the output current flowing through the series field winding 29. Open circuit output voltage, being a function of open circuit field strength, will still depend only on the excitation of the main field winding since under open circuit conditions, no current flows through the series field 29. Closed circuit output current, however, will be a function of the resultant compound differential field strength. This produces a characteristic curve such as the dashed line 73a in FIG. 3 with an open circuit output voltage within the the ideal range C and a low closed circuit output current, as indicated at B. To achieve this characteristic, it is evident from FIGS. 2 and 3 that the open circuit field strength must be X amp-turns and the closed circuit field strength must be W amp-turns. This means an excitation field of X amp-turns and a series field of X minus W amp-turns are required. Since the closed circuit output current is B amps, the number of turns in the series field winding 29 required to achieve the characteristic curve 73a is approximately equal to X minus W divided by B.

FIG. 4 Modification

In the arc welder shown in FIG. 1, the switch 47 is a simple two position operable to bring the additional field winding 29 either into or out of the load current circuit, and the direction of winding of the winding 29 and its connection with the switch 47 is such that when the switch is set to bring it into play, its flux field opposes that of the main winding 29. This arrangement extends the usefulness of the welder into a low range of welding currents below those available from the welder without such additional field winding. In some instances, it may be desirable to not only extend the usefulness of the welder at the low end of the welding current range but to also extend it at the high end of the welding current range. When this is the case, the switch 47 of FIG. 1 may be replaced by another switch operable to selectively either: (a) remove the winding 29 from the load current circuit; (b) place the winding 29 in series with the load circuit with the load current flowing through it in such a direction as to create a flux field opposing that of the main winding 28; or (c) placing the winding 29 in series with the load current circuit with the load current flowing therethrough in such a direction as to produce a flux field aiding the field of the main winding 28.

Such a switch may take various different forms and one is shown by way of example 47' in FIG. 4. The switch 47' of FIG. 4 is a three-position one having two wipers or blades mechanically connected to one another for movement in unison to three different positions. In the position of the switch 47' illustrated in FIG. 4 the winding 29 is removed from the load circuit and has no effect. In the other two positions of the switch 47', the winding 29 is connected in series with the load circuit with the load current in one position of the switch flowing in one direction through the winding 29 and in the other position of the switch flowing in the opposite direction through the winding 29. Whe the load current through the winding 29 is in the direction to create a flux which opposes that of the field winding 29, the operation is exactly the same as that described above for the welder of FIG. 1 with the series winding in play. When the current through the winding 29 is in the direction to create a flux aiding the flux of the winding 29, it will be understood that the operation of the welder is such that higher welder output currents, located above the upper end of the normal welding range of FIG. 2, are obtainable which nevertheless have corresponding open circuit voltages within the desired range illustrated at C in FIG. 2.

I claim:

1. An arc welder comprising an inductor alternator having a stator core with a plurality of poles, a first field winding fixed relative to said stator core and having when excited a magnetic field passing through said stator poles, a plurality of generating windings fixed relative to said stator core and received on said poles thereof, and a windingless rotor rotatable relative to said stator core to cyclically vary the reluctance of flux paths through said stator poles to vary the flux passing through said poles and to thereby induce alternating voltages in said generating windings, a variable electrical supply connected to excite said first field winding, two output terminals, means connected between said generating windings and said two output terminals to supply said two output terminals with electrical power derived from the voltages induced in said generating windings, a welding electrode, means for connecting one of said two output terminals to said electrode, means for connecting the other of said two output terminals to a workpiece, a second field winding included in said inductor alternator and fixed relative to said stator core and having when excited a magnetic field which also passes through said stator poles, and means for selectively connecting and disconnecting said second field winding to and from exciting series relationship with the output current from said two output terminals.

2. An arc welding comprising an inductor alternator having a stator core with a plurality of poles, a first field winding fixed relative to said stator core and having when excited a magnetic field passing through said stator poles, a plurality of generating windings fixed relative to said stator core and received on said poles thereof, and a windingless rotor rotatable relative to said stator core to cyclically vary the reluctance of flux paths through said stator poles to vary the flux passing through said poles and to thereby induce alternating voltages in said generating windings, a variable direct current electrical supply connected to excite said first winding, two output terminals, a rectifier connected between said generating windings and said two output terminals to supply said output terminals with a rectified voltage derived from the alternating voltages induced in said generating windings, a welding electrode, means for connecting one of said two output terminals of said electrode, means for connecting the other of said two output terminals to a workpiece, a second field winding included in said inductor alternator and fixed relative to said stator core and having when excited a magnetic field which also passes through said stator poles, and means for selectively connecting and disconnecting said second field winding to and from exciting series relationship with the output current passing through said two output terminals.

3. An arc welder defined in claim 2 further characterized by said means for connecting and disconnecting said second field winding to and from exciting series relationship with the output current passing through said two output terminals comprising a switch means having one position at which said second field winding is connected in series relationship with said output current and with the connection being such that said output current flows through said second field winding in such a direction as to cause said magnetic field of said second field wind to oppose said magnetic field of said first field winding as excited by said variable voltage source.

4. An arc welder defined in claim 2 further characterized by said means for connecting and disconnecting said second field winding to and from series relationship with the output current passing through said two output terminals comprising a switch means having one position at which said second field winding is connected in series relationship with said output current and with the connection being such that said output current flows through said second field winding in such a direction as to cause said magnetic field of said second field winding to aid said magnetic field of said first field winding as excited by said variable voltage source.

5. An arc welder defined in claim 2 further characterized by said means for connecting and disconnecting said second field winding to and from series relationship with the output current passing through said two output terminals comprising a switch means having at least three positions, said switch being so constructed and said second field winding being so connected thereto that at one of said three positions, said second field winding is removed from series relationship with the output current from said two output terminals, at a second of said three positions said second field winding is connected in series relationship with said output current with the connection being such that the output current flows through said second field winding in such a direction as to produce a magnetic field which opposes the magnetic field produced by said first field winding as excited by said variable voltage source, and at a third of said three positions said second field winding is connected in series relationship with said output current with the connection being such that the output current flows through said second field winding in such a magnetic direction as to produce a field which aids the magnetic field produced by said first field winding as excited by said variable voltage source.

* * * * *